Dec. 23, 1952  C. G. MOLLER  2,622,609

FLUID CONTROL APPARATUS

Filed Oct. 24, 1945

Inventor

Conrad G. Moller

By Rockwell & Bartholow
Attorneys

Patented Dec. 23, 1952

2,622,609

UNITED STATES PATENT OFFICE 2,622,609

FLUID CONTROL APPARATUS

Conrad G. Moller, New Canaan, Conn., assignor to The Berger Brothers Company, New Haven, Conn., a corporation of Connecticut Application October 24, 1945, Serial No. 624,246

26 Claims. (Cl. 137—38)

1

This invention relates to a fluid-control apparatus, and more particularly to a device controlling the admission of fluid under pressure to a receptacle, such, for example, as an aviator's suit, to inflate the suit or portions thereof so as to place pressure upon certain parts of the body of the aviator.

As is well known, the pilot of a plane during certain maneuvers is subjected to a considerable strain when the direction of the plane is suddenly changed, thus subjecting the pilot to the action of centrifugal force, which tends to cause the blood to flow toward the extremities of the body and away from the head and other vital organs. As a result, pilots have been caused to lose consciousness, or "black out," with disastrous results. To prevent such an effect, aviators have been provided with suits containing inflatable bladders or compartments which, when inflated, exert pressure on certain parts of the body and prevent the blood from flowing to the extremities, particularly to the lower extremities.

It is undesirable, however, for the pilot to be subjected to this pressure at all times, it being preferred that he be subjected to no pressure until need arises for it, and, in that event, that the degree of pressure be regulated according to the degree of centrifugal force to which he is subjected. It is also desirable that the inflation and deflation of the suit, as well as the regulation of the pressure obtaining therein, be effected automatically without attention on the part of the pilot himself.

In some instances the air pressure available on the airplane is relatively high, much higher than that desired to be employed in inflating the aviator's suit. In such event, it is necessary to provide such a control apparatus that not only will the air be admitted to the suit and exhausted therefrom at the proper time and to the proper degree of pressure, but also that the high pressure which exits at the source be effectively metered or cut down so that the suit may be inflated at a much lower pressure. It has been found, for example, that certain controlling devices may operate in a fairly satisfactory manner when the pressure at the source is relatively low or not greatly above the maximum pressure desired for inflation of the suit, while they would not give satisfactory operation when the air at the pressure source was under considerably higher pressure.

It is contemplated by the present invention to provide a pressure-control apparatus which may be employed to inflate the suit of an aviator from a source of pressure considerably higher than that desired in the suit, and at the same time to regulate the admission of the air into the suit and to vary the degree of pressure obtaining in the suit in accordance with the degree of centrifugal force to which the pilot is subjected. In other words, the device is designed to automatically admit air under pressure to the suit when the pilot is subjected to centrifugal force of a predetermined value, and to vary or regulate the pressure obtaining in the suit according to the degree of centrifugal force as it may rise or decline, so that under ordinary flying conditions no pressure will exist in the suit, but when the effect of pressure is desired it will be forthcoming and will, moreover, be at the proper level to counteract the injurious effects occasioned by the action of centrifugal force on the pilot. Also the suit, after being once inflated, will, through the control apparatus, be deflated when a drop occurs in the centrifugal force, so that when the pressure is no longer needed in the suit the aviator will not be subjected to it.

One object of the present invention is to provide a fluid-control apparatus of the class described, which shall be of relatively simple construction.

Another object of the invention is to provide a fluid-control apparatus to effect the admission of air under pressure to the suit of an aviator or another point of delivery, in accordance with the value of centrifugal force, the pressure in the suit being regulated or varied according to the value of centrifugal force to which the pilot is subjected, the admission and regulation both being effected by the action of a single valve.

Still further object of the invention is to provide a fluid-control apparatus of the class described, which will operate satisfactorily even when the air pressure at the source of delivery to the apparatus may be considerably higher than that desired in the aviator's suit or other receptacle to which the air is delivered.

Other objects of the invention will appear as the description proceeds.

To these and other ends the invention consists in the novel features and combinations of parts to be hereinafter described and claimed.

Figure 1:
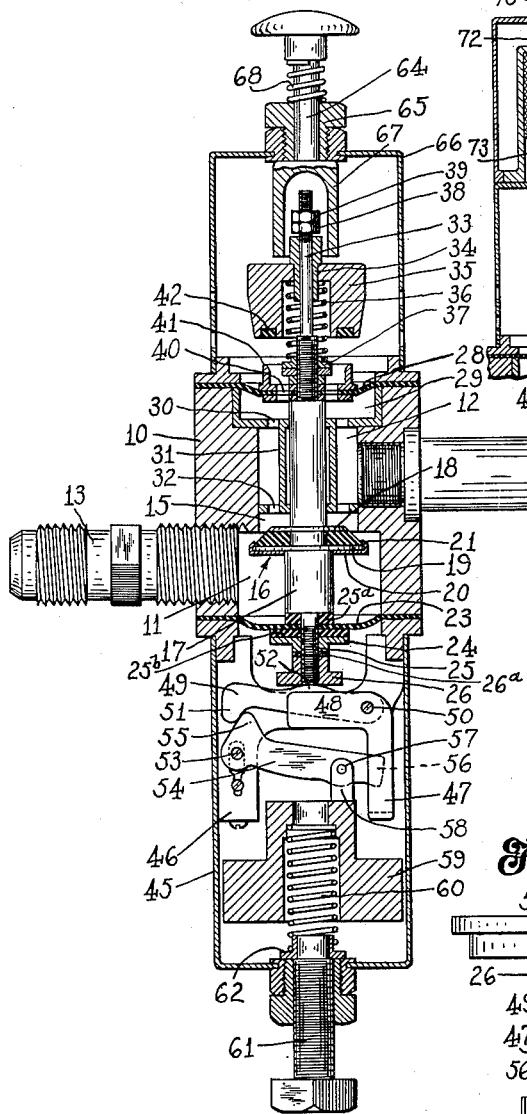
Fig. 1 is a sectional view of a fluid-control apparatus embodying my invention.

To illustrate a preferred embodiment of my invention, I have shown a fluid-supply apparatus comprising a housing or casing 10 having therein an admission chamber 11 and a supply or outlet chamber 12. Fluid such as air, for example, under pressure is designed to enter the chamber 11 through the inlet tube 13, and designed to be delivered from the chamber 12 through the outlet tube 14. It will be understood that the outlet tube is connected by suitable means to the bladders of the suit of an aviator, or some other point of delivery at which the air under pressure is to be used.

The chambers 12 and 11 communicate through a valve port 15 controlled by a valve 16 mounted on a stem 17. The valve 16 may be of natural or synthetic rubber such as neoprene, for example, and be confined between disks 18 and 19. As high pressures may be employed, there will be a tendency for the air to pull the valve away from the lower disk 19 in its passage through the port 15, and this may be prevented by the employment of a sheet metal disk 20 disposed below the disk 19 and crimped over the lower edge of the valve, as shown at 21.

The chamber 11 is closed by a diaphragm 23, the valve stem 17 being secured to the diaphragm by a nut 24 threaded upon a reduced end 25 of the stem which passes through the diaphragm. Between the nut 24 and the stem 17 are compressible rubber washers 25ª and 25ᵇ, between which the diaphragm is clamped. The upper of these washers 25ª is seated against a downwardly facing shoulder on the stem 17 formed by the reduced end 25, while the lower of these washers 25ᵇ is seated against the adjustable nut 24.

Adjustment of the nut 24 will change the initial setting of the diaphragm with respect to the valve stem 17, for if the nut is adjusted downwardly, that portion of the diaphragm adjacent the reduced end 25 of the stem 17 will also move downwardly due to the expansion of the washer 25ª. This adjustment enables the regulation of the pressure obtaining in chamber 12, as pressure obtaining in the chamber 11 causes the diaphragm to stretch and be deflected downwardly, a given pressure causing the diaphragm to stretch a given amount and move the valve stem downwardly a given amount. However, if the diaphragm is in a lower position on the valve stem, obtained by adjusting the nut 24 downwardly, this downward distention of the diaphragm will effect a smaller movement of the valve stem and valve carried thereby. In other words, adjustment of the nut 24 on the reduced end 25 of the valve stem serves to adjust the amount of movement imparted to the valve 16 by a given pressure in the chamber 11.

On the lower end of the reduced portion 25 of the valve stem is threaded a lock nut 26 which serves to hold the nut 24 in adjusted position. A lock washer 26ª may, if desired, be inserted between the nuts 24 and 26.

Adjacent its upper end the valve stem 17 is secured to a second diaphragm 28, which diaphragm lies above a chamber 29 in communication with the chamber 12 through openings 30 formed in a frame member 31, which serves as a guide for the valve stem, this frame member also being provided with openings 32 at its lower end which permit air passing around valve 16 to enter the chamber 12. With this construction it will be noted that the diaphragm 28 will be subject to the air pressure obtaining in the chamber 12.

The stem 17 is provided with a reduced portion 33 at its upper end, upon which is slidably mounted a collar 34 to which is secured a weighted member 35, the weighted member being thus free to slide upon the valve stem. This member is, however, held in an upward position by a compression spring 36 disposed in a socket in the member 35 and bearing at its lower end against a washer or collar 37 threaded upon the stem of the valve. Upward movement of the weight on the stem is limited by means of a nut 38 threaded upon the stem 33 above the collar 34, and this nut may be locked in position by the lock nut 39. It will be apparent, therefore, that the valve stem 17 at all times carries the weight 35, and that when this weight is subjected to the action of centrifugal force, for example, the pressure exerted by it upon the valve stem through the spring 36 will be increased.

It may also be here noted that the diaphragm 28 is provided with a plurality of openings 40, around the valve stem 17, which openings normally form vent ports for the chamber 29, and that about these openings is positioned an annular cup 41 which opens upwardly, and the mouth of which while normally open, may at times be closed by an annular seal or washer 42 disposed at the lower face of the weighted member 35.

Mounted in a casing 45 at the lower part of the device is an H-shaped frame 46, one arm of which is doubled back upon itself in spaced relation, as shown at 47, and then turned laterally, as at 48. Mounted in the space between this arm and the main portion of the frame is a lever 49 pivoted at 50, which lever is provided with a cam end 51 and a raised portion 52 bearing against the adjustable button 26 on the lower end of the valve stem 17.

Pivoted to the other leg of the H-shaped frame at 53 is a lever 54 having a nose 55 adapted to engage the cam end 51 of the lever 49. The lever 54 is provided with a tail portion 56 guided in the space between the member 47 and one leg of the H-shaped frame 46, so that it will be confined to move in a single plane, and to the lever 54 is pivoted at 57 a plate 58 secured to a weighted member 59 supported from the lower end of the casing part 45 by a compression spring 60. The tension of this spring may be adjusted by the adjusting screw 61 entering through the bottom of the casing 45, and carrying on its end a cup 62 which serves as a seat for the spring.

It will be apparent that with this construction the weight of the member 59 is normally carried by the spring 60, the latter holding the weight in a predetermined position in the casing, as determined by the adjustment of the spring. When, however, the device is subjected to the action of centrifugal force, the effect of the weight 59 will be increased so as to compress the spring and move the lever 54 in a clockwise direction about its pivot 53, for an effect which will be explained hereinafter.

As will shortly be explained, the above parts of the apparatus are designed to be under automatic control, depending upon the degree of centrifugal force to which the device is subjected. It is, however, desirable that a pilot be able to inflate his suit manually if he so desires. To accomplish this result, a push rod 64 is slidably mounted in a bushing 65 secured at the upper end of the casing part 66, which surrounds the upper end of the valve stem, and this push rod 64 carries on its lower end a cup-shaped member 67 designed to embrace the reduced end 33 of the valve stem and bear against the weight 35. A spring 68 normally holds the push rod 64 in an upper position.

It will be understood that the inlet tube 13 will normally be connected to a source of fluid pressure such as air under pressure, for example, and that this pressure may be considerably higher than that desired to be delivered to the aviator's suit through the outlet tube 14. Under normal conditions, when it is not desired to have the suit inflated, as, for example, when the operator is not subjected to the action of centrifugal force, the parts of the device will stand in the position shown in Fig. 2, with the valve 16 seated against the edge of the port 15 so that none of the pressure air will enter the chamber 12, the chamber 11 forming a dead end for this air. In this position of the parts the nose 55 of the lever 54 will lie against the cam 51 of the lever 49, and as the boss 52 on the latter stands against the button 26, the valve 16 will be held in closed position. The lever 54 will be maintained in this position by the spring 60. It will be understood, however, that, notwithstanding the fact that the pressure fluid is dead-ended in the chamber 11, there will be little force acting to open the valve 16, as the forces acting downwardly on the diaphragm and upwardly on the valve will substantially balance. The valve stem is, however, subject to the weight of the member 35 and the weight of the valve and stem itself, so that this weight must be carried by the nose 55 of the lever 54, and this will be the case when the weight 59 is maintained in the position shown in Fig. 2 by the spring 60, and the valve will be prevented from opening.

It is desired, however, that when the operator becomes subjected to centrifugal force of a predetermined amount, air will be admitted to his suit. This will be accomplished in the present instance by the action of weight 59, which will, by the action of centrifugal force, be moved downwardly in opposition to the spring 60, thus rocking the lever 54 to the position shown in Fig. 1, where it has moved out of engagement with the nose 51 of the lever 49 and permitted the latter lever to move in a counterclockwise direction about its pivot 50, and therefore will permit the valve 16 to drop from its seat. In this position of the parts, as shown in Fig. 1, air under pressure will be admitted to chamber 12, and thence through outlet tube 14 to the aviator's suit. Also a small portion of this air will exhaust or vent to the atmosphere through openings 30 and 40, there being a sufficient excess of pressure to permit this and still inflate the suit to the desired degree.

It will also be apparent that the diaphragm 28 will be subjected to the pressure in chamber 29, which will be the same as that obtaining in chamber 12, and that when this pressure against the diaphragm 28 becomes sufficient to raise this diaphragm against the weight of the valve parts and the member 35, the valve 16 will again be closed. This action, therefore, limits the pressure which can exist in chamber 12, and which, therefore, can exist in the aviator's suit. Thus the valve 16 serves as a metering or reducing valve to reduce the pressure entering the suit and maintain it at a predetermined amount regardless of the pressure existing at the source of supply.

As the valve stem carries the weight 35, it will be apparent that, as the centrifugal force increases, this weight will exert an increased effect, tending to hold the valve open, and will, therefore, increase the pressure permitted in chamber 12 (and, of course, the pressure existing in the suit) in proportion to the increase in centrifugal force, and will likewise decrease the pressure in chamber 12 as centrifugal force decreases. In other words, when the pilot is subjected to centrifugal force of a predetermined amount, the suit of the aviator will be inflated with a predetermined pressure, and as the value of the centrifugal force rises from this predetermined minimum, the pressure in the suit will be proportionately increased, and likewise will drop when the value of the centrifugal force drops.

If, when the suit has been inflated to a point above the minimum determined by the initial setting of the control weight 59, there should be a decrease in centrifugal force, downward pressure on the valve 16 by the weight 35 would be less and pressure in the chamber 29 on diaphragm 28 would be sufficient to close this valve and shut off pressure to the chamber 12. While this would prevent further inflation of the suit, the pressure in the latter would be excessive for the lowered value of centrifugal force. This pressure will cause the weight 35 to raise the seal 42 from the cup 41 and permit the suit to vent through openings 40 until the pressure is lowered sufficiently to again effect the opening of the valve 16. A balance is, therefore, maintained which acts to maintain a suit pressure in proportion to the value of centrifugal force to which the pilot is subjected. When this force falls below a predetermined minimum, the valve will close and be held in closed position by the levers 49 and 54, and the suit will completely vent through the openings 40, it being understood that at this minimum the weight 35 will be held off the cup 41 by the spring 36.

While the spring 36 normally maintains the weight 35 in a raised position above the mouth of the cup 41, if the action of centrifugal force is sufficiently great this cup may be moved downwardly upon the valve stem until the annular sealing member 42 will contact the upper edge of the cup, and, therefore, prevent loss of air through the openings 40. Normally, however, these openings will be in restricted communication with the atmosphere, so that the suit may vent and pressure therein be relieved as the value of centrifugal force declines.

Figure 4:
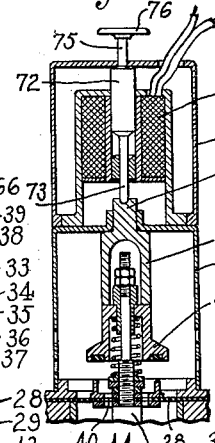
Fig. 4 is a fragmentary sectional view of the upper portion of the apparatus of a modified construction.
Figure 2:
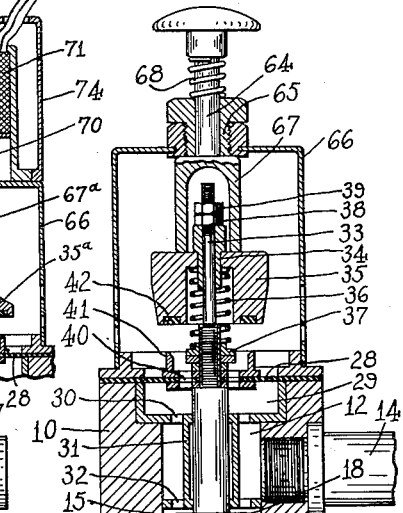
Fig. 2 is a similar view showing the parts in another position.
Figure 3:
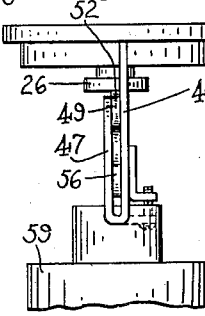
Fig. 3 is a side elevational view of the valve-controlling levers and support therefor.

In Fig. 4 of the drawings, I have shown a modified form of my device in which the controlling valve 16 may be electrically operated instead of manually by the push rod 64 shown in Figs. 1 and 2. In this form of my invention, the upper weighted member 35ª may be slightly smaller than the corresponding member 35 shown in Figs. 1 and 2, and resting upon this weight is a cup-shaped member 67ª having a stem 70 slidably mounted in the casing part 66. Mounted above the casing part 66 is a solenoid 71 provided with a movable plunger 72 having a stem 73 engaging the stem 70, so that movement of the plunger downwardly will effect downward movement of the cup-shaped member 67ª and the weighted member 35ª together with the valve 16.

The solenoid may be enclosed within a cap 74 and the plunger 72 be provided with a stem 75 extending through this cap and bearing a push button 76, so that the plunger may be pressed downwardly with the fingers, if desired, as well as by the energizing of the solenoid. In other words, with the device shown in Fig. 4, the operator may be able to press a switch button, which is conveniently accessible, and thus energize the solenoid 71 to effect the opening of the valve 16 and the inflation of the suit, or he may, if he desires, manually press the button 76 and effect the same result.

It will be apparent that I have provided a compact and relatively simple structure in which control and regulation of a source of fluid pressure is effected by means of a single valve to inflate an aviator's suit, for example, to a predetermined degree, varying according to the value of centrifugal force to which the pilot is subjected regardless of the air pressure at the source of supply.

While I have shown and described a preferred embodiment of my invention, it will be understood that it is not to be limited to all of the details shown, but is capable of modification and variation within the principles of the invention and within the scope of the claims.

What I claim is:

1. In a fluid-pressure-control apparatus, means providing a fluid-pressure inlet chamber and an outlet chamber adapted to be placed in communication with the inlet chamber, a valve for controlling the communication between said chambers, a member acting against the valve for holding said valve in closed position, means for moving said member to inoperative position, and means controlled by the action of centrifugal force to open said valve upon movement of said member to inoperative position.

2. In a fluid-pressure-control apparatus, a casing having an inlet chamber and an outlet chamber, a port affording communication between said chambers, a valve to control said port, a flexible diaphragm closing said inlet chamber opposite the port, a stem carrying said valve and engaged by said diaphragm, a member engaging said stem to hold the valve in position to close said port, and a spring-supported weight acting against said member to hold it in position to engage the stem.

3. In a fluid-pressure-control apparatus, a casing having an inlet chamber and an outlet chamber, a port affording communication between said chambers, a valve to control said port, a flexible diaphragm closing said inlet chamber opposite the port, a stem carrying said valve and engaged by said diaphragm, a member movable relatively to said valve for holding said valve in position to close the port, and means under control of centrifugal force for moving said member to position to permit opening movement of the valve.

4. In a fluid-pressure-control apparatus, a casing having an inlet chamber and an outlet chamber, a port affording communication between said chambers, a valve to control said port, a flexible diaphragm closing said inlet chamber opposite the port, a stem carrying said valve and engaged by said diaphragm, a member movable relatively to said valve for holding said valve in position to close the port, means under control of centrifugal force for moving said member to releasing position, said means including a spring urging said holding means to operative position, and a weighted member opposing the action of said spring.

5. In a fluid-pressure-control apparatus, a casing having an inlet chamber and an outlet chamber, a port affording communication between said chambers, a valve to control said port, a flexible diaphragm closing said inlet chamber opposite the port, a stem carrying said valve and engaged by said diaphragm, a member movable relatively to said valve for holding said valve in position to close the port, a weighted member connected to said member and tending to release the same under the force of gravity, and a spring urging said member to operative position.

6. In a fluid-pressure-control apparatus, means providing a fluid-pressure inlet chamber and an outlet chamber adapted to be placed in communication with the inlet chamber, a port and a cooperating valve for controlling the communication between said chambers, a member movable relatively to said valve for holding said valve in closed position, means controlled by the action of centrifugal force to effect the release of said member, and additional means to vary the position of the valve upon release of said member to vary the effective opening of the port thereby.

7. In a fluid-pressure-control apparatus, means providing a fluid-pressure inlet chamber and an outlet chamber adapted to be placed in communication with the inlet chamber, a port and a cooperating valve for controlling the communication between said chambers, means for holding said valve in closed position, means controlled by the action of centrifugal force to effect the release of said holding means, and means to vary the position of the valve upon release of said holding means to vary the effective opening of the port thereby, said means being weighted so as to be controlled by the action of centrifugal force.

8. In a fluid-pressure-control apparatus, means providing a fluid-pressure inlet chamber and an outlet chamber adapted to be placed in communication with the inlet chamber, a port and a cooperating valve for controlling the communication between said chambers, means for holding said valve in closed position, means for effecting release of said holding means, means controlled by the action of centrifugal force to open said valve upon the release of said holding means, and means to vary the position of the valve upon release of said holding means to vary the effective opening of the port thereby, said varying means comprising a diaphragm exposed to fluid pressure in the outlet chamber and connected to said valve to move it toward closed position.

9. In a fluid-pressure-control apparatus, means providing a fluid-pressure inlet chamber and an outlet chamber adapted to be placed in communication with the inlet chamber, a port and a cooperating valve for controlling the communication between said chambers, means for holding said valve in closed position, means for effecting release of said holding means, means controlled by the action of centrifugal force to open said valve upon the release of said holding means, means to vary the position of the valve upon release of said holding means to vary the effective opening of the port thereby, said varying means comprising a diaphragm exposed to fluid pressure in the outlet chamber and connected to said valve to move it toward closed position, and a weighted member the weight of which is carried by said valve, urging the latter to open position.

10. In a fluid-pressure-control apparatus, means providing a fluid-pressure inlet chamber and an outlet chamber adapted to be placed in communication with the inlet chamber, a port and a cooperating valve for controlling the communication between said chambers, means for holding said valve in closed position, means for effecting release of said holding means, means controlled by the action of centrifugal force to open said valve upon the release of said holding means, means to vary the position of the valve upon release of said holding means to vary the effective opening of the port thereby, said varying means being controlled by the action of centrifugal force, said outlet chamber being provided with vent ports, and means controlling the effective opening of said ports.

11. In a fluid-pressure-control apparatus, means providing a fluid-pressure inlet chamber and an outlet chamber adapted to be placed in communication with the inlet chamber, a port and a cooperating valve for controlling the communication between said chambers, means for holding said valve in closed position, means for effecting release of said holding means, means controlled by the action of centrifugal force to open said valve upon the release of said holding means, means to vary the position of the valve upon release of said holding means to vary the effective opening of the port thereby, said varying means comprising a diaphragm exposed to fluid pressure in the outlet chamber and connected to said valve to move it toward closed position, and a weighted member the weight of which is carried by said valve, urging the latter to open position, and said outlet chamber having vent ports controlled by said weighted member.

12. In a fluid-pressure-control apparatus, means providing a fluid-pressure inlet chamber and an outlet chamber adapted to be placed in communication with the inlet chamber, a valve for controlling the communication between said chambers, means for holding said valve in closed position, means for effecting release of said holding means, said valve being mounted on the stem, means actuated by pressure in said outlet chamber to vary the position of the valve upon release of said holding means comprising a weighted member on the valve stem tending to urge the valve to open position, and a diaphragm exposed to fluid pressure in the outlet chamber and connected to said stem.

13. In a fluid-pressure-control apparatus, means providing a fluid-pressure inlet chamber and an outlet chamber adapted to be placed in communication with the inlet chamber, a valve for controlling the communication between said chambers, means for holding said valve in closed position, means for effecting release of said holding means, said valve being mounted on the stem, means actuated by pressure in said outlet chamber to vary the position of the valve upon release of said holding means comprising a weighted member on the valve stem tending to urge the valve to open position, a diaphragm exposed to fluid pressure in the outlet chamber and connected to said stem, and a spring on the valve stem urging said member upwardly, said outlet chamber having vent means controlled by said weighted member.

14. A fluid-pressure-control means comprising a casing having inlet means, outlet means, and a valve port affording communication between said means, a valve controlling said port and disposed on the inlet side thereof, a diaphragm exposed to pressure on the inlet side of said valve, a second diaphragm exposed to pressure on the outlet side of said valve, both said diaphragms being connected to said valve and tending to move it in opposite directions, vent means for venting said outlet means and a weighted member carried by the valve and tending to move it to open position.

15. A fluid-pressure-control means comprising a casing having inlet means, outlet means, and a valve port affording communication between said means, a valve controlling said port and disposed on the inlet side thereof, a diaphragm exposed to pressure on the inlet side of said valve, a second diaphragm exposed to pressure on the outlet side of said valve, both said diaphragms being connected to said valve and tending to move it in opposite directions, a weighted member carried by the valve and tending to move it to open position, and vent means on the outlet side of said valve, said vent means being controlled by said weighted member.

16. A fluid-pressure-control means comprising a casing having inlet means, outlet means, and a valve port affording communication between said means, a valve controlling said port and disposed on the inlet side thereof, a diaphragm exposed to pressure on the inlet side of said valve, a second diaphragm exposed to pressure on the outlet side of said valve, both said diaphragms being connected to said valve and tending to move it in opposite directions, a weighted member carried by the valve and tending to move it to open position, and releasable means to hold said valve in closed position.

17. A fluid-pressure-control means comprising a casing having inlet means, outlet means, and a valve port affording communication between said means, a valve controlling said port and disposed on the inlet side thereof, a diaphragm exposed to pressure on the inlet side of said valve, a second diaphragm exposed to pressure on the outlet side of said valve, both said diaphragms being connected to said valve and tending to move it in opposite directions, a weighted member carried by the valve and tending to move it to open position, means to hold said valve in closed position, and a second weighted member tending to release said holding means.

18. Apparatus to deliver to a receptacle a fluid under varying pressure from a fluid-pressure source, said apparatus comprising inlet and outlet means and a port affording communication between said means, valve means adapted to close said port, means holding said valve in closed position, means for effecting release of said holding means, and means controlled by the action of centrifugal force to move said valve, upon release of said holding means, to positions to vary the effective opening of said port according to the degree of centrifugal force to which the apparatus is subjected.

19. Apparatus to deliver to a receptacle a fluid under varying pressure from a fluid-pressure source, said apparatus comprising inlet and outlet means and a port affording communication between said means, valve means adapted to close said port, means holding said valve in closed position, means for effecting release of said holding means, and means acting on said valve upon release of said holding means to move the same to open position, said last-named means varying the pressure of the air passing through said outlet means according to the degree of centrifugal force to which the apparatus is subjected.

20. Apparatus to deliver to a receptacle a fluid under varying pressure from a fluid-pressure source, said apparatus comprising inlet and outlet means and a port affording communication between said means, valve means adapted to close said port, means holding said valve in closed position, means for effecting release of said holding means, means controlled by the action of centrifugal force to move said valve, upon release of said holding means, to positions to vary the effective opening of said port according to the degree of centrifugal force to which the apparatus is subjected, and means substantially balancing the forces acting on said valve when the latter is in closed position.

21. A fluid-pressure-control means comprising a casing having inlet means, outlet means, and a valve port affording communication between said means, a valve controlling said port and disposed on the inlet side thereof, a diaphragm exposed to pressure on the inlet side of said valve, a second diaphragm exposed to pressure on the outlet side of said valve, both said diaphragms being connected to said valve and tending to move it in opposite directions, a weighted member carried by the valve and tending to move it to open position, a member projecting from the casing to apply pressure to the valve stem to open the valve, means for movably mounting said last-named member on the casing, and means for holding said valve in a closed position when the valve structure is not subjected to the action of centrifugal force.

22. A fluid-pressure-control means comprising a casing having inlet means, outlet means, and a valve port affording communication between said means, a valve controlling said port and disposed on the inlet side thereof, a diaphragm exposed to pressure on the inlet side of said valve, a second diaphragm exposed to pressure on the outlet side of said valve, both said diaphragms being connected to said valve and tending to move it in opposite directions, a weighted member carried by the valve and tending to move it to open position, a member movably mounted on the casing and adapted to engage said weight to apply pressure thereto to open the valve, said member projecting from the casing for manual engagement, and means for holding said valve in a closed position when the valve structure is not subjected to the action of centrifugal force.

23. A fluid-pressure-control means comprising a casing having inlet means, outlet means, and a valve port affording communication between said means, a valve controlling said port and disposed on the inlet side thereof, a diaphragm exposed to pressure on the inlet side of said valve, a second diaphragm exposed to pressure on the outlet side of said valve, both said diaphragms being connected to said valve and tending to move it in opposite directions, a weighted member carried by the valve and tending to move it to open position, a member projecting from the casing to apply pressure to the valve stem to open the valve, means for movably mounting said last-named member on the casing, electrically operated means to move said member toward the valve stem, and means for holding said valve in a closed position when the valve structure is not subjected to the action of centrifugal force.

24. A fluid-pressure-control means comprising a casing having inlet means, outlet means, and a valve port affording communication between said means, a valve controlling said port and disposed on the inlet side thereof, a diaphragm exposed to pressure on the inlet side of said valve, a second diaphragm exposed to pressure on the outlet side of said valve, both said diaphragms being connected to said valve and tending to move it in opposite directions, a weighted member carried by the valve and tending to move it to open position, and means for adjusting the point of connection of said first-named diaphragm with the valve to vary the amount of movement of the valve effected by a given deflection of the diaphragm.

25. A fluid-pressure-control apparatus, means providing a fluid pressure inlet chamber, and an outlet chamber adapted to be placed in communication with the inlet chamber, a valve port and cooperating valve for controlling communication between said chambers, means blocking movement of said valve to position to open the part, and means actuated by centrifugal force to move said blocking means to an inoperative position in which it no longer functions to prevent opening movement of the valve.

26. A fluid-pressure-control apparatus, means providing a fluid pressure inlet chamber, and an outlet chamber adapted to be placed in communication with the inlet chamber, a valve port and cooperating valve for controlling communication between said chambers, means blocking movement of said valve to position to open the port, means actuated by centrifugal force to move said blocking means to an inoperative position in which it no longer functions to prevent opening movement of the valve, and means controlled by centrifugal force to vary the position of the valve when said blocking means is in inoperative position.

CONRAD G. MOLLER.

REFERENCES CITED

The following references are of record in the file of this patent:

UNITED STATES PATENTS

| Number | Name | Date |
|---|---|---|
| 207,832 | Vail | Sept. 10, 1878 |
| 765,561 | Crowe | July 19, 1904 |
| 877,003 | Schulze | Jan. 21, 1908 |
| 1,114,213 | Wilson | Oct. 20, 1914 |
| 1,248,650 | Gustasfson | Dec. 4, 1917 |
| 1,823,668 | Schelledy | Sept. 15, 1931 |
| 1,844,954 | Good | Feb. 16, 1932 |
| 2,089,144 | Work | Aug. 3, 1937 |
| 2,163,203 | Kegresse | June 20, 1939 |
| 2,213,663 | Berard | Sept. 3, 1940 |

FOREIGN PATENTS

| Number | Country | Date |
|---|---|---|
| 673,327 | France | Oct. 7, 1929 |